US006535310B1

(12) United States Patent
Rasala et al.

(10) Patent No.: US 6,535,310 B1
(45) Date of Patent: Mar. 18, 2003

(54) STRICTLY NON-BLOCKING WAVELENGTH DIVISION MULTIPLEXED (WDM) CROSS-CONNECT DEVICE

(75) Inventors: April Patricia Rasala, Newton, MA (US); Gordon Thomas Wilfong, Gillette, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/471,641

(22) Filed: Dec. 23, 1999

(51) Int. Cl.[7] ................................................. H04J 14/02
(52) U.S. Cl. ......................... 359/124; 359/128; 385/17
(58) Field of Search ................................. 359/124, 128; 385/17

(56) References Cited

U.S. PATENT DOCUMENTS 6,333,799 B1 * 12/2001 Bala et al. .................. 359/128
6,362,905 B1 * 3/2002 Fukashiro et al. .......... 359/128

OTHER PUBLICATIONS

A. Rasala and G. Wilfong,; Strictly Non–blocking WDM Cross–connects.
G. Wilfong, B. Mikkelsen, C. Doerr and M. Zirngibl; WDM Cross–Connect Architectures with Reduced Complexity; Journal of Lightwave Technology, vol. 17, No. 10, Oct. 1999, pp. 1–10.

A. Rasala and G. Wilfong; Asymmetric Strictly Non–Blocking WDM Cross–Connects, p. 1.

* cited by examiner

Primary Examiner—Kinfe-Michael Negash

(57) ABSTRACT

The present invention provides a strictly non-blocking WDM cross-connect that utilizes a relatively small number of wavelength interchangers. The cross-connect of the present invention comprises two fabrics and one or more wavelength interchangers that interconnect the fabrics. The fabrics are either pathwise strictly non-blocking or pathwise wide-sense non-blocking. In the former case, the WDM cross-connect is strictly non-blocking, i.e., both pathwise and wavelength strictly non-blocking. In the latter case, the cross-connect is wavelength strictly non-blocking and is pathwise wide-sense non-blocking, i.e., a routing algorithm is required to ensure that any sequence of connection requests and withdrawals can be routed without disturbing any currently routed requests. In accordance with the preferred embodiment of the present invention, the cross-connect is strictly non-blocking and comprises a minimum number of wavelength interchangers, namely, 2k–1, where k is a positive integer equal to the number of input fibers and to the number of output fibers of the cross-connect. The cross-connect is capable of providing a route for any sequence of connection requests and withdrawals without having to disturb any currently routed requests and without the need for a routing algorithm.

16 Claims, 2 Drawing Sheets

STRICTLY NON-BLOCKING WAVELENGTH DIVISION MULTIPLEXED (WDM) CROSS-CONNECT DEVICE

TECHNICAL FIELD OF THE INVENTION

The present invention relates to communications and, more particularly, to a wavelength division multiplexed (WDM) cross-connect device for use in optical networks.

BACKGROUND OF THE INVENTION

A wavelength division multiplexed (WDM) cross-connect device, hereinafter referred to as a WDM cross-connect, is a network of fibers connected to various optical components that allow a set of input fibers to be connected to a set of output fibers. Each fiber in the network can support some fixed number n of wavelength channels. In other words, at any time there can be up to n signals along a fiber with each signal using a distinct wavelength. WDM cross-connects are capable of performing wavelength interchanging by connecting a wavelength channel on an input fiber to a different wavelength channel on an output fiber. WDM cross-connects comprise components that are capable of switching an incoming wavelength channel onto any different wavelength channel on an outgoing fiber. These components are commonly referred to as wavelength interchangers.

Another type of component comprised by WDM cross-connects is known as an optical switch. An optical switch has an arbitrary number of fibers passing into it and out of it and any wavelength channel on any incoming fiber can be switched to the same wavelength channel on any outgoing fiber, assuming the wavelength channel is not already being used. The WDM cross-connect also comprises optical fibers that are connected to the optical switches and to the wavelength interchangers at nodes. The optical fibers provide directed paths through the WDM cross-connect in the sense that the signal on any optical fiber only travels in a forward direction through the cross-connect and can never meet itself When a request for a connection in a WDM cross-connect is made, the WDM cross-connect must perform two fundamental tasks. First of all, a route or path must be found in the WDM cross-connect from the requested input fiber to the requested output fiber. Secondly, for each fiber in the route, an unused wavelength channel must be assigned so that (1) the wavelength channels assigned on the input and output fibers are the requested wavelength channels, and (2) the wavelength channels assigned on any two consecutive fibers in the route are the same, unless there is a wavelength interchanger connecting the two consecutive fibers.

WDM cross-connects have been proposed that have "non-blocking" properties. The term "non-blocking" corresponds to the ability of the WDM cross-connect to satisfy requests for connections, i.e., the requests are not "blocked" as a result of an unavailable route or wavelength channel. Some of these WDM cross-connects are rearrangeably non-blocking, which means that satisfying requests for new connections may require changing the paths and/or the wavelength channels of already-configured connections. In a WDM cross-connect, disrupting connections in order to create new connections is undesirable since doing so requires buffering of the connections that are to be rearranged.

A WDM cross-connect is considered to be pathwise rearrangeably non-blocking in cases where connection requests can be routed through the cross-connect, but any additional requests received after routing the original set of requests may require some of the previously routed requests to be re-routed. Some WDM cross-connects are considered to be pathwise wide-sense non-blocking. These WDM cross-connects employ a routing algorithm that enables any sequence of connection requests and withdrawals to be satisfied without disturbing any of the currently routed requests. Pathwise strictly non-blocking cross-connects are known that enable any set of requests to be routed through the cross-connect without disturbing the routes associated with previous requests.

A request for a connection requires not only a route from the input fiber to the output fiber, but also a wavelength channel assignment along the route that only changes wavelength channels at wavelength interchangers and that begins and ends on the requested wavelength channels. These requests for connections between wavelength channels on input and output fibers are commonly referred to as demands. When a demand is made following a previously routed demand, the routes and/or the wavelength channel assignments associated with the previously routed demands may need to be changed. The definitions of wavelength rearrangeably non-blocking, wavelength wide-sense non-blocking and wavelength strictly non-blocking are analogous to the definitions provided above for pathwise rearrangeably non-blocking, pathwise wide-sense non-blocking and pathwise strictly non-blocking, respectively.

A WDM cross-connect that is both pathwise and wavelength strictly non-blocking will be referred to hereinafter as a strictly non-blocking WDM cross-connect. One known type of strictly non-blocking WDM cross-connect that it is capable of handling new requests for connections without disturbing those already existing utilizes k log k wavelength interchangers, where k corresponds to the number of input fibers and output fibers. Therefore, the number of wavelength interchangers utilized in this type of WDM cross-connect is relatively large. Since the overall cost of a WDM cross-connect is primarily attributable to the costs associated with the wavelength interchangers, it is desirable to minimize the number of wavelength interchangers incorporated into the WDM cross-connect. Therefore, it would be desirable to provide a strictly non-blocking cross-connect that minimizes the number of wavelength interchangers that are needed to provide the WDM cross-connect with strictly non-blocking properties.

FIG. 1 is a block diagram of a WDM cross-connect 1 that is commonly referred to as a standard design WDM cross-connect. The fabric 2 between the input optical fibers 3 and the output optical fibers 4 of the WDM cross-connect 1 includes a plurality of nodes (not shown) and a plurality of optical fibers (not shown) that interconnect the nodes. Each of the nodes is comprised of a wavelength granularity switch that switches signals received by the fabric 2 on the input fibers 3 onto selected output fibers 4. The WDM cross-connect 1 comprises a controller 6 that controls the operations of the fabric 2 and of the wavelength interchangers 5. The controller 6 causes the wavelength granularity switches to select an appropriate output fiber 4 so that the wavelength of the signal routed onto the output fiber 4 will not be the same as the wavelength of a signal that already exists on the output fiber 4.

The WDM cross-connect 1 comprises k wavelength interchangers 5, where k is a positive integer equal to the number of input fibers 3 and output fibers 4. Each wavelength interchanger 5 is connected to a single input fiber 3. Each input fiber 3 is capable of simultaneously carrying signals at n wavelengths, $\lambda_1$ through $\lambda_n$, where $\lambda$ denotes wavelength and n is a positive integer. Therefore, each input fiber supports n wavelength channels. Each of the wavelength interchangers 5 is capable of permuting the wavelength of a signal on the input fiber 3 to a different wavelength. The fabric 2 then causes the signal to be routed onto a selected output fiber 4. The controller 6 controls the selection of the wavelength channels by the wavelength interchangers 5.

FIG. 2 is a block diagram of a WDM cross-connect 7 that is commonly referred to as a modified standard design WDM cross-connect. The WDM cross-connect 7 is a modification of the design shown in FIG. 1 and includes a wavelength interchanger 8 connected to each of the output fibers 4. The WDM cross-connect 7 comprises 2k wavelength interchangers. The additional wavelength interchangers 8 connected to the output optical fibers 4 enable the wavelength channel utilized by a signal on any of the output optical fibers 4 to be permuted. This enables demands to be handled that specify a particular output wavelength, which is not the case with the WDM cross-connect 1 shown in FIG. 1.

The additional wavelength interchangers 8 provide the WDM cross-connect 7 maid: with improved versatility. However, 2k wavelength interchangers are utilized by the WDM cross-connect 7, which significantly increases the cost of the cross-connect in comparison to the cost associated with the cross-connect shown in FIG. 1. The cross-connects 1 and 7 are, at best, rearrangeably non-blocking.

Accordingly, a need exists for a strictly non-blocking WDM cross-connect design that minimizes the number of wavelength interchangers that are needed to provide the WDM cross-connect with strictly non-blocking properties.

SUMMARY OF THE INVENTION

The present invention provides a strictly non-blocking WDM cross-connect that utilizes a relatively small number of wavelength interchangers. The cross-connect of the present invention comprises two fabrics and one or more wavelength interchangers that interconnect the fabrics. The fabrics are either pathwise strictly non-blocking or pathwise wide-sense non-blocking. In the former case, the WDM cross-connect is strictly non-blocking, i.e., both pathwise and wavelength strictly non-blocking. In the latter case, the WDM cross-connect wavelength is strictly non-blocking and is pathwise wide-sense non-blocking, i.e., a routing algorithm is required to ensure that any sequence of connection requests and withdrawals can be routed without disturbing any currently routed requests.

In accordance with the preferred embodiment of the present invention, the WDM cross-connect is strictly non-blocking and comprises a minimum number of wavelength interchangers, namely, 2k−1, where k is a positive integer equal to the number of input fibers and to the number of output fibers. The WDM cross-connect is capable of providing a route for any sequence of connection requests and withdrawals without having to disturb any currently routed requests and without the need for a routing algorithm.

These and other features and advantages of the present invention will become apparent to those skilled in the art from the following description, drawings and claims.

DETAILED DESCRIPTION OF THE INVENTION

Figure 1:
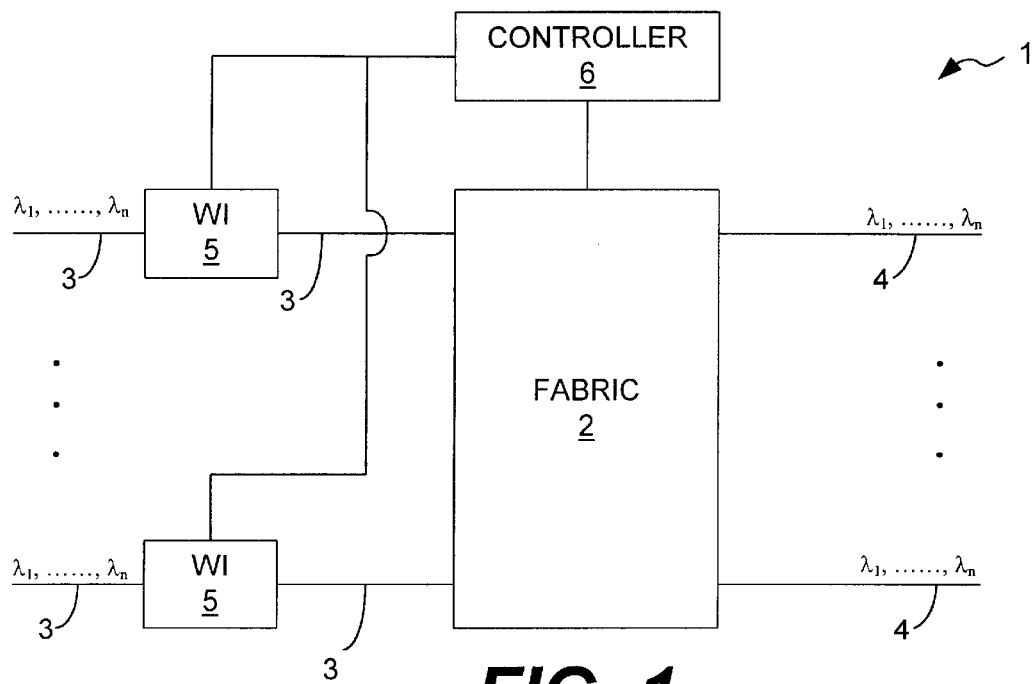
FIG. 1 is a block diagram of a WDM cross-connect that is known as a standard design cross-connect.

Prior to describing the WDM cross-connect of the present invention, the variables that are typically used to describe the properties of a WDM cross-connect will be defined. A detailed discussion of the WDM cross-connect of the present invention will then be provided, which will include a proof that utilizes these variables and that demonstrates the strictly non-blocking nature of the WDM cross-connect of the present invention.

A k×k WDM cross-connect that supports n>1 wavelengths may be defined as a directed acyclic graph C=(V, A, Λ) where V is the set of nodes, A is the set of arcs between the nodes, $\Lambda=\{\lambda_1, \lambda_2, \ldots, \lambda n\}$ is the set of available wavelengths, and k is integer equal to the number of input and output fibers. An arc is typically viewed as corresponding to a fiber having a single direction along which signals are permitted to flow. The node set V is partitioned into four subsets, namely, the set of input nodes, I, the set of output nodes, O, the set of optical switches, S, and the set of wavelength interchangers, W. Sets I and O each contain k nodes. Each node in the set I has an indegree of 0 and an outdegree of 1 whereas each node in set O has an outdegree of 0 and indegree of 1. An arc directed out of a node in set I corresponds to an input fiber and an arc directed into a node in set O corresponds to an output fiber. A node in set W has an indegree 1 and an outdegree 1 whereas the indegree and outdegree of a node in set S are unconstrained, although in current practice they are likely to have an input degree and an output degree equal to 2.

The topology of a cross-connect as given by the directed acyclic graph is typically referred to as the fabric of the cross-connect. However, this definition of the fabric assumes that the wavelength interchangers are part of the fabric. In accordance with the present invention, the fabric is considered to be separate from the wavelength interchangers. Therefore, in accordance with the present invention, the fabric should be considered as including the optical switches, the optical fibers and the nodes, which correspond to the locations where the optical fibers connect to the optical switches. It should be noted that this definition of the fabric is being used herein for illustrative purposes to describe the various aspects of the present invention.

A demand, d, is defined as a 4-tuple (w, x, y, z), where w is an input node, x is a wavelength, y is an output node and z is a wavelength. The wavelengths x and z will be referred to as the input and output wavelengths, respectively. A route, r, in C is a directed path from a node in set I to a node in set O. Along each of the fibers in a route r, one of the n wavelengths is assigned such that consecutive fibers are assigned the same wavelength, unless the common node of the fibers is in set W. A route for a demand d=(w, x, y, z) is a route from input node w to output node y such that, on the corresponding input fiber, the route is assigned wavelength x and on the corresponding output fiber, the route is assigned wavelength z.

A valid demand set is a set of demands that satisfies the following conditions:

(i) for each input node, a, and each wavelength, λ, there is at most one demand with both a as the input node and λ as the input wavelength; and (ii) for each output node, b, and each wavelength, λ, there is at most one demand with both b as the output node and λ as the output wavelength.

A demand set $D=\{d_1, d_2, \ldots, dm\}$ is said to be satisfied by a cross-connect if there exists a set of routes $R=\{r_1, r_2, \ldots, r_m\}$ where:

(i) $r_i$ is a route for $d_i$, $1 \leq i \leq m$; and (ii) if for some value $i \neq j$, $r_i$ and $r_j$ share some fiber, f, then they must be assigned distinct wavelengths along fiber f.

Such a route set, R, is referred to as a valid routing of the demand set D, and R is said to satisfy D. A wavelength interchanger, $WI_i$, services a particular demand, $d_i$, if the demand $d_i$ is routed through wavelength interchanger $WI_i$.

Figure 3:
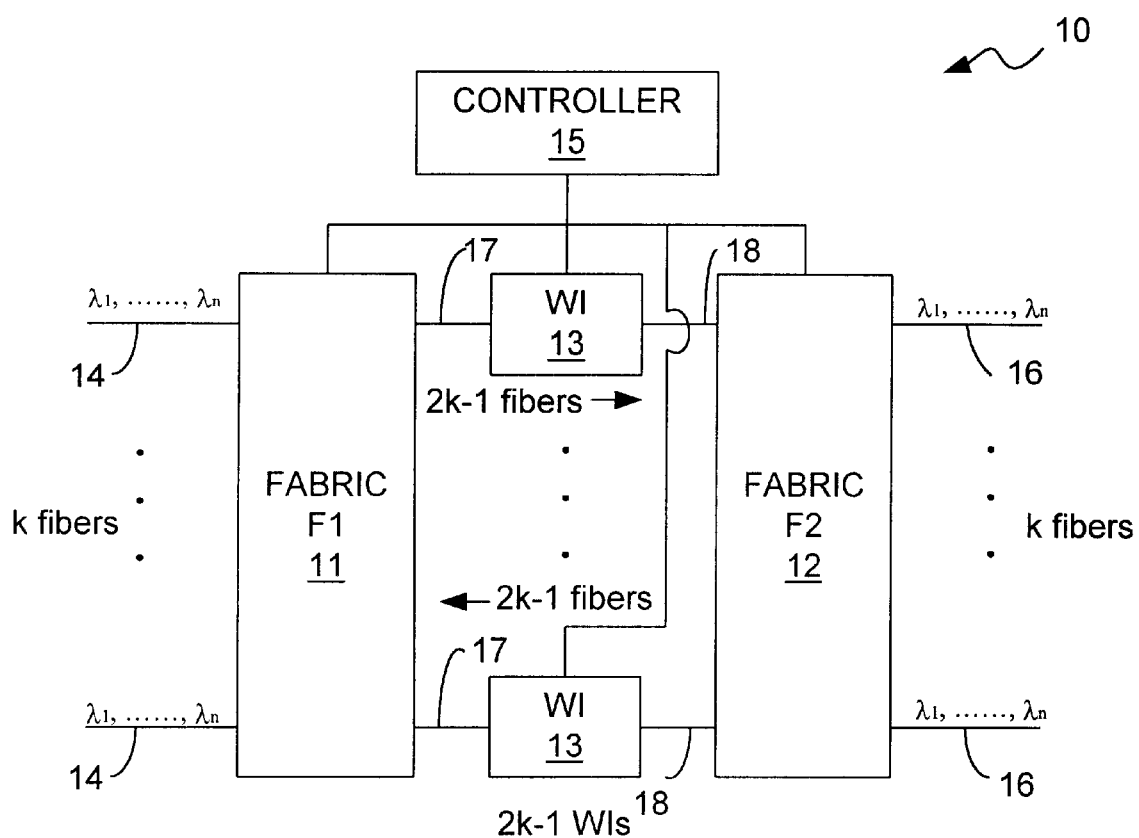
FIG. 3 is a block diagram of the strictly non-blocking WDM cross-connect of the present invention in accordance with the preferred embodiment.

A discussion of the WDM cross-connect 10 of the present invention will now be provided with reference to FIG. 3. In accordance with the present invention, the fabric of the cross-connect 10 is split into two parts 11 and 12 that are connected by one or more wavelength interchangers 13. The two parts will be referred to hereinafter as fabric F1 and fabric F2. The fabrics F1 and F2 comprise the optical switches and the optical fibers that are connected to the optical switches at nodes of the fabrics. Therefore, the fabrics F1 and F2 do not include any devices for changing the wavelength of any signal. The operations of the cross-connect are controlled by the controller 15, which may be, for example, a microprocessor programmed with appropriate software.

The first fabric F1 has k input ports and 2k–1 output ports. The second fabric F2 has 2k–1 inputs and k outputs. Each of the input ports of the fabric F1 is optically coupled to an input optical fiber 14 and each of the output ports of the second fabric F2 is optically coupled to an output optical fiber 16. 2k–1 optical fibers 17 optically couple the output ports of the first fabric F1 to the input ports of the wavelength interchangers 13. 2k–1 optical fibers 18 optically couple the output ports of the wavelength interchangers 13 to the input ports of the second fabric F2.

In accordance with the present invention, only 2k–1 wavelength interchangers (WIs) are needed to render the WDM cross-connect 10 strictly non-blocking, i.e., both pathwise and wavelength strictly non-blocking. This is true for demands that specify only the input wavelengths or that specify both the input and output wavelengths. Any directed path from an input fiber to an output fiber will pass through exactly one wavelength interchanger. Thus, the only location at which a route can change wavelengths is at the single wavelength interchanger 13 along the directed path of the route. Therefore, a route for a demand (a, $\lambda_1$, b, $\lambda_2$) will be assigned a wavelength $\lambda_1$ from the input fiber, a (14), until it reaches a wavelength interchanger 13, at which point a wavelength $\lambda_2$ may be assigned for the remainder of the route through the cross-connect 10 and over the output fiber b (16). Thus, the wavelength assignment for any demand is completely determined by the demand.

A proof set forth below proves that the cross-connect 10 of the present invention is both pathwise strictly non-blocking and wavelength strictly non-blocking. To show that the cross-connect 10 is strictly non-blocking, it is assumed that fabrics F1 and F2 are both pathwise strictly non-blocking. The proof then demonstrates that the cross-connect 10 is strictly non-blocking. The proof utilizes mathematical symbols and phraseology that are well known in the art of cross-connect theory and design. Therefore, a detailed discussion of these symbols and of the phraseology used in discussing them will not be provided herein. Those skilled in the art will understand the meanings associated with these symbols and the phraseology used herein in discussing them.

PROOF: In order to demonstrate that the cross-connect 10 is strictly non-blocking, it must be shown that, for any demand set D of previously routed demands, there is a valid route for any new demand d=(a, $\lambda_1$, b, $\lambda_2$), where $D \cup \{d\}$ is a valid demand set. A set R is a routing set that constitutes any valid routing of demand set D. A subset $D_1$ is defined as a subset of demands in set D that have an input wavelength $\lambda_1$. A set of wavelength interchangers $W_1$ is defined as $W_1 \subset \{WI_1, WI_2, \ldots, WI_{2k-1}\}$, where $WI_j \epsilon W_1$ if and only if there is a demand in subset $D_1$ that is routed through $WI_j$ by R, and where j is a positive integer that is greater than or equal to 1 and less than or equal to 2k–1.

In any valid demand set D, there can be at most k demands that use input wavelength $\lambda_1$. Therefore, the number of demands in subset $D_1$ is at most k–1 and $|W_1| \leq k-1$. Assuming that $W_2$ denotes a set of all wavelength interchangers that service a demand that utilizes output wavelength $\lambda_2$, then by the same argument it can be shown that $|W_2| \leq k-1$. Since the cross-connect 10 comprises 2k–1 wavelength interchangers and since it must be true that $|W_1| + |W_2| \leq 2k-2$, there must be some wavelength interchanger $WI_j \notin W_1 \cup W_2$. Since fabrics F1 and F2 are assumed to be pathwise strictly non-blocking, a path must exist from input fiber a (14) to wavelength interchanger $WI_j$ and from wavelength interchanger $WI_j$ to output fiber b (16). Furthermore, it must be possible to choose a path from input fiber a (14) to $WI_j$ that is edge disjoint from all other paths that service a demand with input wavelength $\lambda_1$. Likewise, it must be possible to choose a path from $WI_j$ to output fiber b (16) that is edge disjoint from all other paths that service a demand with output wavelength $\lambda_2$.

Figure 2:
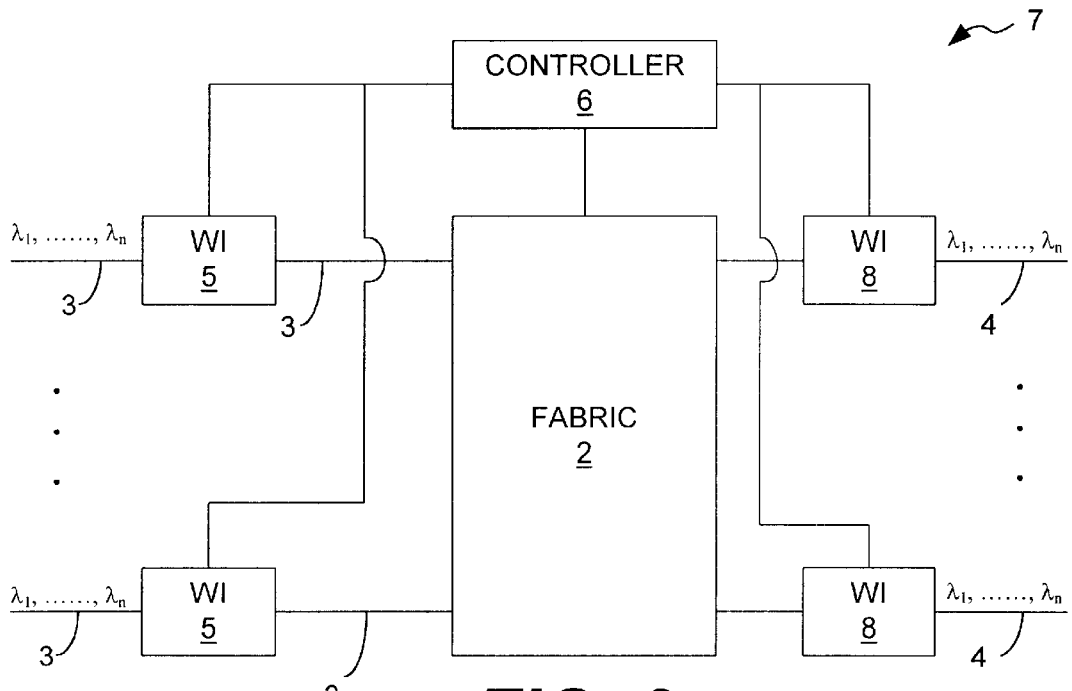
FIG. 2 is a block diagram of a WDM cross-connect that is known as a modified standard design cross-connect.

Therefore, demand d can use this path with wavelength $\lambda_1$ from input fiber a (14) to wavelength interchanger $WI_j$ and with wavelength $\lambda_2$ from wavelength interchanger $WI_j$ to output fiber b (16) without requiring that any routes in routing set R be changed. This implies that the cross-connect 10 is a strictly non-blocking cross-connect if fabrics $F_1$ and $F_2$ are both pathwise strictly non-blocking. As stated above, cross-connect designs are known that are pathwise strictly non-blocking. Therefore, a detailed discussion of the manner in which the fabrics F1 and F2 are designed to ensure that they are pathwise strictly non-blocking will not be provided herein. By utilizing 2k–1 wavelength interchangers in conjunction with the two pathwise strictly non-blocking fabrics F1 and F2, as shown in FIG. 2, the cross-connect 10 is rendered strictly non-blocking. Those skilled in the art will understand the manner in which the cross-connect 10 can be physically and logically configured to achieve these goals.

It should also be noted that the proof set forth above could also be used to show that, if fabrics F1 and F2 are made to be pathwise wide-sense non-blocking, the cross-connect 10 of the present invention will be pathwise wide-sense non-blocking and wavelength strictly non-blocking. In the interest of brevity, this will not be demonstrated herein. Preferably, the fabrics F1 and F2 will be pathwise strictly non-blocking so that the cross-connect 10 will be strictly non-blocking. However, the cross-connect 10 of the present invention may also be used with two fabrics that are pathwise wide-sense non-blocking.

The present invention has been described with reference to the preferred embodiments. However, those skilled in the art will understand that the present invention is not limited to the embodiments explicitly described herein. Those skilled in the art will understand that modifications may be made to the embodiments discussed above that are within the scope of the present invention. It will also be understood that the present invention is not limited with respect to the types of components that are used to create the cross-connect 10 of the present invention. Those skilled in the art will understand that a variety of different components may be used to produce the fabrics F1 and F2 and the wavelength interchangers 13. Those skilled in the art will also understand that a variety of different types of controllers may be used for the controller 15. Those skilled in the art will understand the manner in which a suitable controller may be selected and implemented for controlling the operations of the cross-connect 10.

What is claimed is:

1. A wavelength division multiplexed (WDM) device, the device comprising:

a first fabric having at least one input port and at least one output port, each said at least one input port being adapted to be optically coupled to a respective input optical fiber, each said at least one output port being optically coupled to a respective output optical fiber;

at least one wavelength interchanger, said at least one wavelength interchanger having an input port and an output port, the input port of each said at least one wavelength interchanger being optically coupled to a respective output optical fiber of the first fabric; and a second fabric, the second fabric having at least one input port and at least one output port, each said at least one input port of the second fabric being optically coupled to a respective input optical fiber of the second fabric, each said respective input optical fiber of the second fabric being optically coupled to an output port of a respective one of said at least one wavelength interchanger, each said at least one output port of the second fabric being optically coupled to a respective output optical fiber of the second fabric.

2. The device of claim 1, further comprising:

a controller in communication with the first fabric, the second fabric and said at least one wavelength interchanger, the controller being capable of outputting control signals to the first fabric, the second fabric and said at least one wavelength interchanger, the control signals being utilized by the first fabric, the second fabric and said at least one wavelength interchanger to control the operations thereof.

3. The device of claim 2, wherein the first and second fabrics each comprise at least one optical switch that receives the control signals output by the controller and received by the first and second fabrics, each said at least one optical switch of the first fabric being optically coupled to respective input and output ports of the first fabric, each said at least one optical switch of the second fabric being optically coupled to respective input and output ports of the second fabric, each said at least one optical switch of the first fabric selecting an output optical fiber coupled to the optical switch that a signal carried on an input optical fiber coupled to the optical switch is to be routed onto in accordance with the control signal received by the optical switch from the controller, each of said at least one optical switch of the second fabric selecting an output optical fiber coupled to the optical switch that a signal carried on an input optical fiber coupled to the optical switch is to be routed onto in accordance with the control signal received by the optical switch of the second fabric from the controller.

4. The device of claim 3, wherein the device is strictly non-blocking in terms of both wavelength and routing, and wherein each said wavelength interchanger selects a wavelength that a signal received at the input port of the wavelength interchanger is to utilize on the output optical fiber coupled to the output port of the wavelength interchanger.

5. The device of claim 4, wherein each input optical fiber that is optically coupled to an input port of the first fabric is capable of carrying signals at a plurality of different wavelengths, and wherein each output optical fiber optically coupled to the output ports of the second fabric is capable of carrying optical signals at a plurality of different wavelengths.

6. The device of claim 5, wherein each said at least one wavelength interchanger selects a wavelength that is to be utilized by a signal based on the control signal received by the wavelength interchanger from the controller.

7. A wavelength division multiplexed (WDM) device, the device comprising:

a first fabric having k input ports and 2k−1 output ports, each of the input ports being adapted to be optically coupled to an input optical fiber, each of the output ports being adapted to be optically coupled to an output optical fiber, the first fabric being capable of selecting an output optical fiber that a signal received on an input optical fiber is to be routed onto;

a plurality of wavelength interchangers, each wavelength interchanger having an input port and an output port, each wavelength interchanger being optically coupled at an input port thereof to a respective one of the output optical fibers, each wavelength interchanger capable of selecting a wavelength that a signal carried on the optical fiber coupled to the input port of the wavelength interchanger is to utilize when transmitted on the optical fiber coupled to the output port of the wavelength interchanger; and a second fabric having 2k−1 input ports and k output ports, each of the input ports of the second fabric being optically coupled by an input optical fiber of the second fabric to an output port of a respective one of the wavelength interchangers, each output port of the second fabric being optically coupled to an output optical fiber of the second fabric, the second fabric being capable of selecting an output optical fiber of the second fabric that an optical signal carried on an input optical fiber of the second fabric is to be routed onto.

8. The device of claim 7, further comprising:

a controller in communication with the first fabric, the second fabric and the wavelength interchangers, the controller controlling which output optical fibers of the first and second fabrics are to be utilized for carrying signals received on input optical fibers of the first and second fabrics, respectively, and wherein the controller controls the selection of wavelengths by the wavelength interchangers.

9. The device of claim 8, wherein the first and second fabrics each comprise at least one optical switch that receives control signals from the controller, the optical switch of the first fabric being optically coupled to particular input ports and output ports of the first fabric, the optical switch of the second fabric being optically coupled to particular input ports and output ports of the second fabric, the optical switches selecting output optical fibers onto which signals carried on input optical fibers are to be routed, the selection of the output optical fibers by the optical switches being dependent upon the control signals received by the optical switches from the controller.

10. The device of claim 9, wherein the device is strictly non-blocking in terms of both wavelength and routing.

11. The device of claim 10, wherein each input optical fiber that is optically coupled to an input port of the first fabric is capable of carrying signals at a plurality of different wavelengths, and wherein each output optical fiber that is optically coupled to the output ports of the second fabric is capable of carrying optical signals at a plurality of different wavelengths.

12. The device of claim 11, wherein each of the wavelength interchangers is capable of permuting a signal of a particular wavelength to a different wavelength, and wherein the selection by each wavelength interchanger capable of a wavelength that a signal is to utilize when transmitted on the optical fiber coupled to the output port of the wavelength interchanger is made in accordance with the control signal received by the wavelength interchanger.

13. The device of claim 1, wherein the first and second fabrics are pathwise strictly non-blocking.

14. The device of claim 1, wherein the first and second fabrics are pathwise wide-sense non-blocking, and wherein the device is wavelength strictly non-blocking and is pathwise wide-sense non-blocking.

15. The device of claim 7, wherein the first and second fabrics are pathwise strictly non-blocking.

16. The device of claim 7, wherein the first and second fabrics are pathwise wide-sense non-blocking, and wherein the device is wavelength strictly non-blocking and is pathwise wide-sense non-blocking.

* * * * *